United States Patent [19]

Strubbe

[11] Patent Number: 4,951,031
[45] Date of Patent: Aug. 21, 1990

[54] METHOD AND APPARATUS FOR MEASURING GRAIN LOSS IN HARVESTING MACHINES

[75] Inventor: Gilbert J. I. Strubbe, Zedelgem, Belgium

[73] Assignee: Ford New Holland, Inc., New Holland, Pa.

[21] Appl. No.: 335,658

[22] Filed: Apr. 10, 1989

[30] Foreign Application Priority Data

Apr. 26, 1988 [EP] European Pat. Off. ......... 882008022

[51] Int. Cl.$^5$ .............................................. G08B 21/00
[52] U.S. Cl. ...................................... 340/684; 450/4; 450/5; 56/DIG. 15; 56/10.2
[58] Field of Search ........ 460/4, 5; 56/10.2, DIG. 15; 340/684

[56] References Cited

U.S. PATENT DOCUMENTS

| | | | |
|---|---|---|---|
| 4,036,065 | 7/1977 | Strelioff et al. | 460/5 |
| 4,230,130 | 10/1980 | Staiert | 460/5 |
| 4,296,409 | 10/1981 | Whitaker et al. | 340/684 |
| 4,360,998 | 11/1982 | Somes | 460/5 |
| 4,376,298 | 3/1983 | Sokol et al. | 56/10.2 |
| 4,513,562 | 4/1985 | Strubbe | 56/10.2 |

FOREIGN PATENT DOCUMENTS

| | | |
|---|---|---|
| 0122343 | 10/1984 | European Pat. Off. . |
| 2044266 | 3/1971 | Fed. Rep. of Germany . |
| 2207563 | 8/1973 | Fed. Rep. of Germany . |
| 2430283 | 1/1976 | Fed. Rep. of Germany . |
| 2527090 | 1/1976 | Fed. Rep. of Germany . |
| 2126702 | 10/1972 | France . |
| 2203582 | 5/1974 | France . |
| 2143714 | 2/1985 | United Kingdom . |

Primary Examiner—Joseph A. Orsino
Assistant Examiner—Jill Jackson
Attorney, Agent, or Firm—Larry W. Miller; Frank A. Seemar; Darrell F. Marquette

[57] ABSTRACT

An apparatus is provided for measuring grain loss in a harvesting machine in substantially absolute terms. This apparatus comprises one or more first detectors operable to detect one or more operating condition parameters and to produce a first electrical output signal representative thereof, a plurality of second detectors operable to detect grain separation at a plurality of locations within the machine and to produce second electrical output signals representative thereof, processor means to which the first and second output signals are applied and operable to derive therefrom a substantially absolute indication of grain loss at a given instant, and display means for displaying the grain loss indication.

4 Claims, 5 Drawing Sheets

METHOD AND APPARATUS FOR MEASURING GRAIN LOSS IN HARVESTING MACHINES

BACKGROUND OF THE INVENTION

This invention relates generally to an apparatus for measuring grain loss in harvesting machines, and more particularly, to an apparatus that may be used for measuring grain losses in harvesting machines, lost grain being that grain which is lost by way of either being entrained in the straw which is discharged from the combine separating mechanism to the ground or by way of being discharged together with chaff and other impurities from the combine cleaning apparatus.

Throughout this specification the reference to "grain" is intended to refer to that part of the crop which is threshed and separated from the discardable part of the crop material which is referred to as "straw". In the following description terms such as "forward", "rearward", "left", "right" etc. are used which are words of convenience and which are not to be construed as limiting terms.

Grain loss monitors for harvesting machines are known and these attempt to monitor the amount of grain which is lost by way of being entrained with the straw, chaff and other debris and not separated therefrom. To date, no grain loss monitor has been provided which is able to provide an indication, in absolute terms, of the magnitude of the actual grain loss that is occurring during the harvesting operation. Known monitors have only been able to provide some indication which varies more-or-less proportionally with the variations in the magnitude of the actual grain losses without however having been able to establish the correlation factor between this indication and the actual losses. These known grain loss monitors rely on impact detectors to "count" a fraction of the grain which is being discharged with the straw, chaff and other debris at the back of the machine without knowing however the exact relative proportion between this fraction and the total actual losses.

A number of problems are encountered over and above the basic problem of not being able to provide an exact measurement of the amount of grain being lost. One of the ancillary problems is that known detectors are unable to distinguish with any assurance between impacts occasioned by grain and those occasioned by pieces of straw having a nodule at one end thereof and which can be "seen" by a detector as a grain kernal. This problem is particularly critical in wet grain conditions.

Another problem with known grain loss monitors is the relatively complex procedure which has to be adopted to set up the monitor in the first place. Apart from having to operate a plurality of controls according to the type of crop and the condition of the crop being harvested (the latter being likely to change anyway as one proceeds with the harvesting operation), the operator has to calibrate the monitor to some extent by way setting the relevant controls and then physically checking the straw, chaff and other debris which is being discharged by the machine and using his practiced eye to decide whether or not the extent of grain loss is acceptable. If it is not, then the controls are reset and a further check is made.

When the operator decides that the grain loss is acceptable, he then attempts to operate the machine so as to keep the grain loss monitor "reading" at the same value. If the operator does not use his practiced eye to effect this calibration of a known grain loss monitor, then grain loss can be relatively high even when the monitor might indicate otherwise. This is because, if a crop being harvested is of a type or is in a condition such that it is difficult to separate grain from the straw in which it is entrained, the detectors will detect very little grain because, if the latter is not properly separated from the straw, then it will not impact the detector in the form necessary to be "counted."

Accordingly, in this harvesting situation, the grain loss monitor will indicate that the grain loss is minimal and probably zero when quite the reverse situation may pertain. It will also be appreciated that, in a crop or crop condition which results in an easier separation of grain from the straw, the grain loss monitor will indicate that there is grain loss which, while being true, is at a level which is usually significantly less than for the crop or crop condition having the characteristic of being difficult to separate the grain from the straw. This thus is the reason why the practiced eye of the operator is required for calibration purposes.

It further also will be appreciated that, even with the calibration as described above, the grain loss monitor still does not provide a "reading" in absolute figures of the magnitude of the actual losses. Instead, this monitor "reading" only indicates whether or not the actual losses are at a generally acceptable level. In addition thereto, variations in the grain loss monitor "reading" further also may be interpreted to mean that the actual grain losses vary more-or-less accordingly, i.e. increase or decrease together with an increased, respectively decreased monitor "reading" even though there appears not necessarily to exist a linear correlation therebetween.

Accordingly, it would be desirable to overcome not only this problem of calibration experienced with known grain loss monitors but, more importantly, to provide an apparatus which will measure actual loss of grain.

SUMMARY OF THE INVENTION

According to the present invention an apparatus is provided which includes detector means associated with the threshing and separating mechanism and/or the cleaning apparatus of a harvesting machine for measuring grain loss in said machine, and having at least two detector means associated with a least either said threshing and separating mechanism or said cleaning apparatus. The detector means is mounted at spaced apart locations along the length of the path of the crop material through the mechanism and/or the apparatus and the detector means is operable to detect grain separation rates in the mechanism and/or the apparatus at the locations within the machine and to produce electrical output signals representative thereof. A processor means to which the output signals are applied is operable to derive therefrom a substantially absolute indication of grain loss at a given instant.

Preferably three grain separation detector means are associated with at least either the threshing and separating mechanism or the cleaning apparatus. A first detector means is provided either generally at or adjacent to the receiving end of the separating mechanism or generally at the midpoint (as seen in fore-and-aft direction) of the cleaning apparatus. A second detector means is provided generally at or adjacent to the discharge end of either said separating mechanism or said cleaning apparatus, while the third detector means is provided generally midway between said first and second detector means along the length of either said separating mechanism or said cleaning apparatus. These grain separation detector means preferably are of the impact type.

The processor means have stored therein predetermined data preferably in the form of look-up tables, and are operable to compare therewith data derived from the output signals of the grain separation detector means to derive therefrom a substantially absolute indication of grain loss. Furthermore, the processor means may be programmed to accept the manual input of operating condition parameters and may be operable to compare these parameters with the predetermined data stored in the processor means and with data derived from the output signals of the grain separation detector means to derive therefrom the substantially absolute indication of grain loss. These operating condition parameters may include both crop parameters and/or machine parameters, which are representative of at least one of the following characteristics: type of crop (i.e. wheat, barley, corn . . . ); condition of crop (ripe, unripe . . . ); crop moisture content; specific weight of 1000 kernals of grain; amount of material other than grain (MOG); and ground speed factors (e.g. header width, wheel diameter).

However, one or more of these operating condition parameters, eventually together with still other operating condition parameters, alternatively may be detected by further detector means. These further detector means could be operable to produce a further signal or signals representative of the respective operating condition parameters and to apply the signals to the processor means. These processor means, in this case, would be programmed to apply the further signals against the predetermined data stored within the processor means and the data derived from the output signals of the grain separation detector means to derive therefrom the substantially absolute indication of grain loss. These further detector means may sense one or more of the following conditions: crop moisture content; grain flow; material other than grain (MOG); or ground speed.

In a preferred embodiment, the processor means are programmed with at least one algorithm against which the data derived from the grain separation detector means and the operating condition parameter or parameters inputted by the operator and/or detected with the further detector means, are applied to derive therefrom said substantially absolute grain loss indication. In case more than one algorithm is stored, the processor means is programmed to select the appropriate algorithm for any given circumstance on the basis of the operating condition parameter or parameters. The algorithms may be a logistic selection of the ratio or ratios of pairs of grain separation detector output signals and one or more operating condition parameters. The processor may calculate grain loss in terms of weight per unit of time although other approaches, such as calculations in terms of percentages or weight per unit of surface, are preferred. This information is indicated on a display unit.

The grain flow and material other than grain (MOG) detectors may be effected by the flow metering device disclosed in European patent application no. 85.201.187.3. In addition. The grain separation detector means preferably are of the type such as disclosed in the U.S. patent applications filed concurrently herewith and entitled "Impact Detectors" and "Grain Loss Monitors for Harvesting Machines." Preferably, this type of impact detector is employed because of a high saturation point so that it can be located at a point in the harvesting machine where the incidence of grain is very much higher than that occurring at the end of the straw walkers, for example. Thus, such detectors may be located beneath the threshing and separating mechanism of the harvesting machine so that data can be derived in respect of grain actually separated from the rest of the crop material in said mechanism and as is part of the present invention.

Preferably, means are provided for converting the grain separation detector output signals and the operating condition detector signals into pulsed signals. Counter means responsive to the convertor means are operable to count the pulses of the output signals. Multiplexer means are provided to look at the counts in the counters in rotation, for example every second, and pass the data obtained therefrom to the processor means so that the latter can derive an indication of grain loss therefrom. Each counter is preferably provided with a buffer in order that, when the counter is reset, the count therein can be dumped in the buffer to allow the counter to continue counting.

According to a second aspect of the present invention there is provided a method of measuring grain loss in a harvesting machine which includes the steps of: detecting grain separation at least two locations within the machine; producing output signals representative thereof; applying said output signals to processor means; and deriving therefrom a substantially absolute indication of grain loss at a given instant.

This method of measuring grain loss may include the following additional steps: detecting at least one operating condition parameter; producing a further output signal or signals representative thereof; applying said further output signal or signals to the processor means; comparing said output signals and further output signal or signals in the processor means; and deriving therefrom said substantially absolute indication of grain loss.

BRIEF DESCRIPTION OF THE DRAWINGS

A method and an apparatus for measuring grain loss in a combine harvester will now be described in greater detail, by way of example, with reference to the accompanying drawings wherein.

DETAILED DESCRIPTION OF THE PREFERRED EMBODIMENT

Aspects of the grain loss measuring apparatus according to the present invention also are disclosed in the copending U.S. patent application No. 335653 filed concurrently herewith and entitled "Grain Loss Monitors for Harvesting Machines." The detectors utilized in the present invention preferably are of the type disclosed in greater program, in still another co-pending U.S. patent application No. 335620 filed concurrently herewith and entitled "Impact Detectors." The descriptive portions of both of these above-identified patent applications are hereby incorporated herein by reference.

Figure 1:
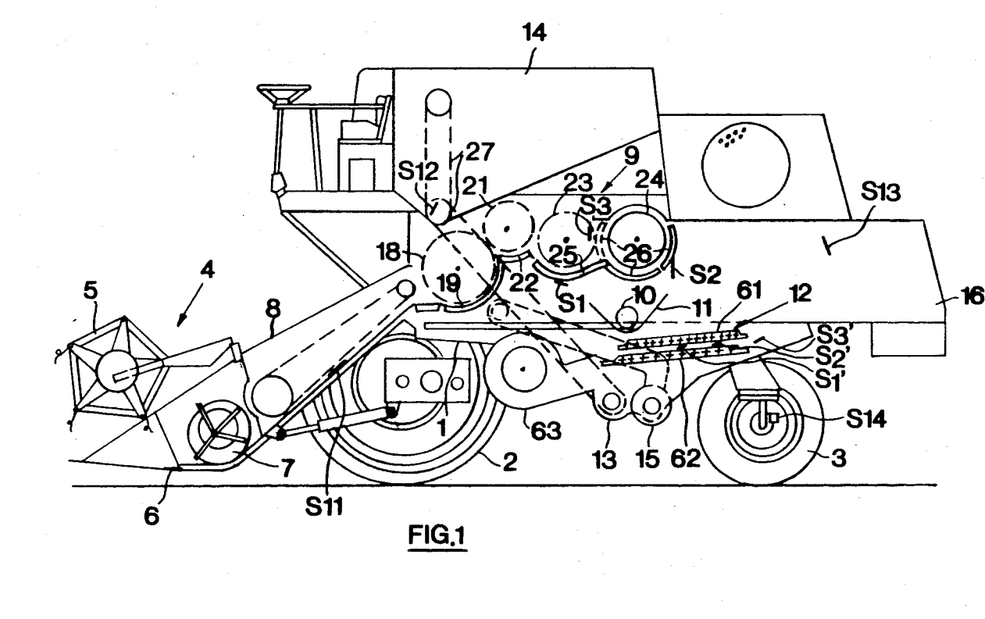
FIG. 1 is a diagrammatic side view of the combine harvester.

Referring first to FIG. 1, the combine harvester comprises a main frame 1 having a front pair of ground engaging wheels 2 and a pair of smaller steerable rear wheels 3. The machine is provided with a header 4 comprising a reel 5, a cutterbar 6 and an auger 7 which consolidates cut crop material centrally of the machine and passes it to a crop elevator 8 which delivers it in a layer to a threshing and separating mechanism indicated generally at 9 and which may be of the type as disclosed in greater detail in GB-A-2.063.039, the description of which is included herein by reference.

Figure 2:
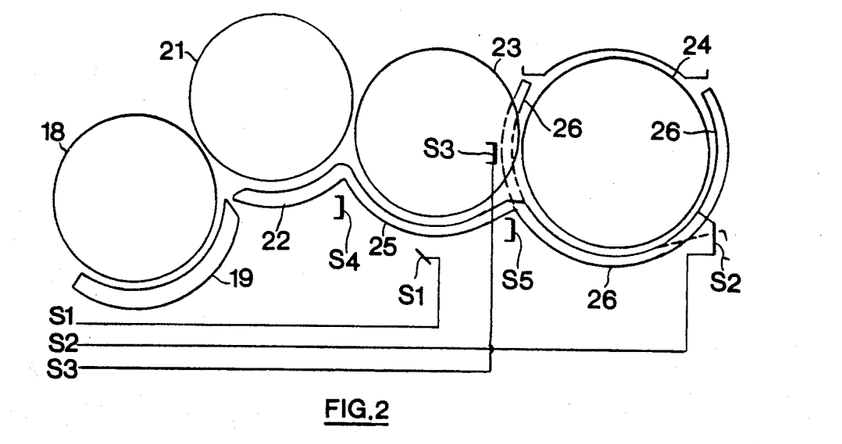
FIG. 2 is an enlarged partial view of FIG. 1 showing the position of grain detector means.

This threshing and separating mechanism 9 is shown on a larger scale in FIG. 2. The rotatable threshing mechanism, which is the forward part thereof, comprises a rotatable threshing cylinder 18, which is cooperable with a stationary threshing concave 19 to thresh the crop material and to separate most of the grain from the rest of the crop material. Rearwardly of the threshing mechanism 18, 19, a rotatable straw beater 21 and stationary beater grate 22 are provided which cooperate to transfer the layer of crop material issuing from the threshing mechanism 18, 19 to the separating mechanism disposed rearwardly thereof while separating further grain through the grate 22 from the discardable part of the crop material.

The separating mechanism comprises two transversely disposed rotors 23 and 24 which are cooperable with respective separator concaves 25 and 26. The forward separator rotor 23 and associated concave 25 have a width which corresponds to the width of the threshing mechanism 18, 19 and the straw beater 21 and are disposed to pass the layer of crop material in a rearward direction across the separator concave 25 while separating further grain through said concave 25. The rearward separator rotor 24 and associated concaves 26 have a larger width than the forward separator rotor 23 and have transversely opposite end portions which extend transversely beyond the corresponding opposite ends of the forward rotor 23. The rearward rotor 24 and associated concaves 26 are disposed to divide the layer received from the forward rotor 23 in two halves and to convey these halves spirally around the rearward rotor 24 in transversely opposite paths towards the discharge outlets at the respective opposite ends of the housing comprising the rotor 24 for discharge therethrough to the ground. During this spiral movement, the crop material again is subjected to a grain separating action resulting in still further grain being separated through he concaves 26.

Grain separated through the threshing concave 19, the beater-grate 22, the separator concave 25 and the central sections of the separator concaves 26 is received directly onto the cleaning apparatus 12. Grain separated through the transversely opposite end portions of the separator concaves 26 falls to auger troughs 11 comprising transverse augers 10 for conveying this grain to the cleaning apparatus 12. Threshed and separated grain is cleaned in a conventional manner in the cleaning apparatus 12 which comprises upper and lower sieves 61, 62 and a cleaning fan 63. Cleaned grain is received in a grain auger 13 and transferred therefrom to a grain tank 14. Tailings are received in a tailings auger 15 and taken therefrom for reprocessing first by a tailings rethresher means and next by the cleaning apparatus 12. Straw issuing from the threshing and separating mechanism 9 and chaff and other debris issuing from the cleaning apparatus 12 are discharged to the ground through a straw hood 16. Grain that is discharged together with this straw, chaff and other debris forms the grain loss. The apparatus according to the present invention aims at providing an indication, in absolute figures, of the magnitude of this grain loss.

Figure 3:
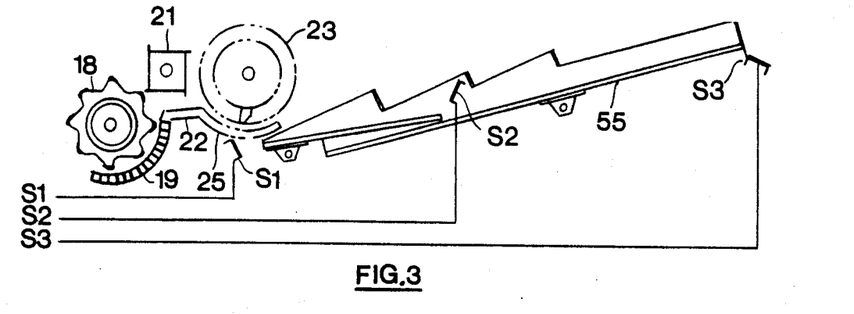
Figs. 3 and 4 are views similar to FIG. 2 but illustrating different threshing and separating means equipped with grain detector means according to the invention.

The rotary threshing and separating mechanism 9 briefly described hereabove is one of various types of threshing and separating mechanisms known in the art. The more conventional threshing and separating mechanism includes straw walker type separator means which may be substituted for the separator rotor 24 and associated separator concaves 26 according to FIGS. 1 and 2. This so-called conventional threshing and separating mechanism is illustrated in FIG. 3. In still another arrangement shown in FIG. 4, the entire threshing and separating mechanism is of a different type and comprises one or two axial flow threshing and separating rotors 57 cooperable with associated threshing and separating concaves 58. A twin rotor axial flow combine of this type is disclosed in greater detail in GB-A-1.399.601, which is also incorporated herein by reference.

The present invention is applicable on anyone of these combine harvesters and may be used for monitoring the grain losses occurring at the discharge end of either the separating mechanism, or the cleaning apparatus or of both said separating mechanism and said cleaning apparatus.

Grain loss sensors conventionally have been provided rearwardly of the discharge end of the separating mechanism and/or the upper cleaning sieve for a fraction of the lost grain kernals to impact thereon as they are discharged to the ground and so as to thereby provide an indication of the magnitude of the actual grain loss that is occurring. Occasionally such grain loss sensors also have been installed, as has been shown in EP-0117.587, forwardly of and adjacent to the discharge end of the separator mechanism. Practice has shown, as has been explained in the introduction of this description, that these prior art arrangements give only a very inaccurate indication of the magnitude of the actual grain losses and that, by no means, this indication can be used to generate an indication of the grain losses in absolute figures.

It has been found, in connection with the present invention, that a better indication of the actual grain losses can be derived from a plurality of measurements of the grain separation at different locations along the length of the threshing and separating mechanism, and/or the cleaning apparatus, in as much as these measurements of grain separation permit a "prediction" of the actual losses that occur rearwardly of the discharge end thereof. It thus should be remarked that the arrangement according to the present invention basically measures grain separated in the separating mechanism and/or the cleaning apparatus and derives an indication for the actual grain losses therefrom, while that prior art arrangements always have attempted to directly measure a fraction of the actual grain losses.

While in the following description, reference will be made mainly only to the threshing and separating mechanism and to the losses occurring at the discharge end thereof, it should be understood that the same also applies to the cleaning apparatus.

Figure 5:
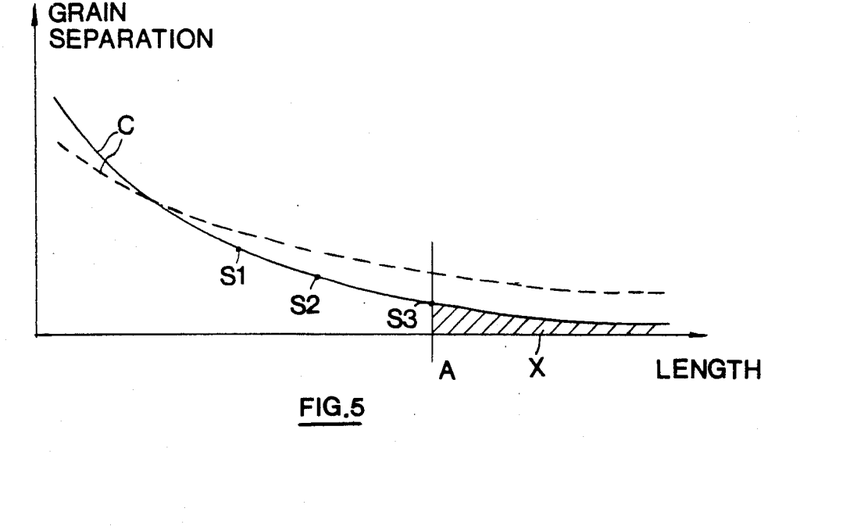
FIG. 5 is a graph illustrating the grain separation distribution along the length of the path of the crop material through the threshing and separating mechanism on the one hand and the grain loss on the other hand.

Considering the grain separation rate along the length of the path of the crop material through the threshing and separating mechanism, it has been noticed that this separation rate decreases from front to rear. It further also has been noticed that, when the separation rate proximate to the discharge end is higher, the total actual losses rearwardly of this discharge end also are higher. FIG. 5 schematically illustrates these findings in a graph wherein the length of the crop path through the threshing and separating mechanism is indicated on the x-axis and the separation rate is indicated on the y-axis. The discharge end of the threshing and separating mechanism is indicated on the x-axis at A and the surface X beneath the extrapolation of the separation rate curve C beyond the discharge end A is indicative of the actual grain loss occurring in a particular situation.

As indicated in this FIG. 5 the separation rate curve C may vary dependent on various conditions. Many influences define the precise location and shape of this curve C. However, when in any particular case, a given number of points along the length of the curve C, say e.g. three points, are determined (by measurement of the grain separation) then the shape and position of this curve C is pretty well defined and, as a consequence, the actual losses that occur at the discharge end of the threshing and separating mechanism, in principle, also can be derived rather accurately therefrom.

In accordance with the present invention, a plurality of grain detector means in the form of impact detectors are provided along the length of the path of the crop material through the threshing and separating mechanism. In a preferred embodiment sensors are provided only at three locations. However, it also should be appreciated that more sensors may be provided to further improve the accuracy of the indication. On the other hand, in certain circumstances, the skilled in the art, will find that only two sensors equally will provide satisfactory results.

The sensors preferably are provided only along the length of the separating portion of the threshing and separating mechanism (or, respectively along the length of the rear half of the cleaning sieves). One of said sensors further also preferably is provided at the same location as where the prior art grain loss sensor members were provided, i.e. either immediately behind or immediately in front of the discharge end of the separating mechanism, respectively the cleaning apparatus.

With reference to FIGS. 1 to 4 the sensors associated with the threshing and separating mechanism are indicated at S1, S2 and S3. With reference to FIG. 1, the sensor associated with the cleaning apparatus are indicated at S1', S2' and S3'. As already indicated and as the characteristics of the apparatus according to the invention are substantially the same irrespective of whether this apparatus is provided to monitor either the separator grain losses or the cleaning grain losses, only the operation thereof in combination with the threshing and separating mechanism will be described hereafter.

With particular reference now to FIG. 2, the detector S1 is located underneath and generally at the mid-point of the separator concave 25 (or seen in the direction of flow of crop material across the concave). The detector S2 is provided adjacent to one of the separator concaves 26 at a point generally midway (again as seen in the direction of flow of the crop material) between the inlet and the outlets of the rotor housing comprising said concaves 26 and the sensor S3 is provided adjacent to one of the offset concaves 26 and proximate to one of the discharge outlets of the rotor housing comprising said concaves 26. The sensor S3 thus is provided generally at the same location as where the prior art grain loss sensor according EP-A-0.117.587 has been provided.

In FIG. 2, additional optional sensors S4 and S5 also have been shown; sensor S4 being located generally adjacent the receiving edge of the separator concave 25 and the sensor S5 being provided generally at the transition between the concaves 25 and 26. As seen in the direction of flow of the crop material through the separating mechanism, the sensors are provided in the following sequence : S4, S1, S5, S2 and S3. Whenever possible, the sensors S1–S5 preferably are mounted at a specific angle to the tangent to the rotors 23 and 24 with which they are associated; this angle being in the range of 30° to 35° in order to avoid impacts upon the sensor surfaces at right angles by grain and straw which issues straight radially out of the concaves. Apart from this orientation of the sensor surfaces relative to the tangent as described, it is also necessary to position the sensors at an angle of at least 35° relative to the horizontal so as to avoid accumulation of material on top of the impact surfaces thereof.

Figure 4:
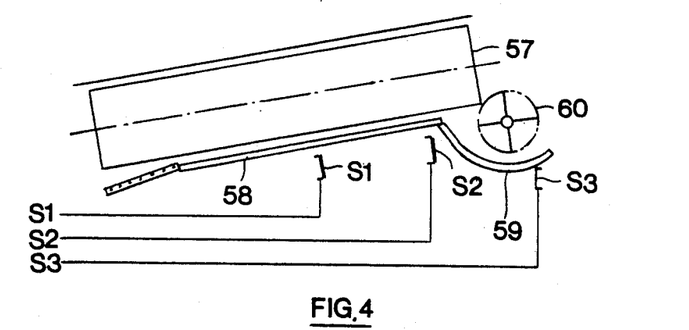

Referring now to FIG. 3, it will be seen that the sensors S1, S2 and S3 are provided respectively underneath the separator concave 25 generally at a mid-point thereof; within a straw walker 55 again generally at a mid-point thereof and finally generally at the rearward discharge end of said straw walker 55. With reference to FIG. 4 illustrating the axial flow type threshing and separating mechanism, the sensors S1, S2 and S3 are provided respectively underneath the middle section of the threshing and separating concave 58 and the forward and rearward edges of the concave 59 associated with the discharge beater 60.

Figure 6:
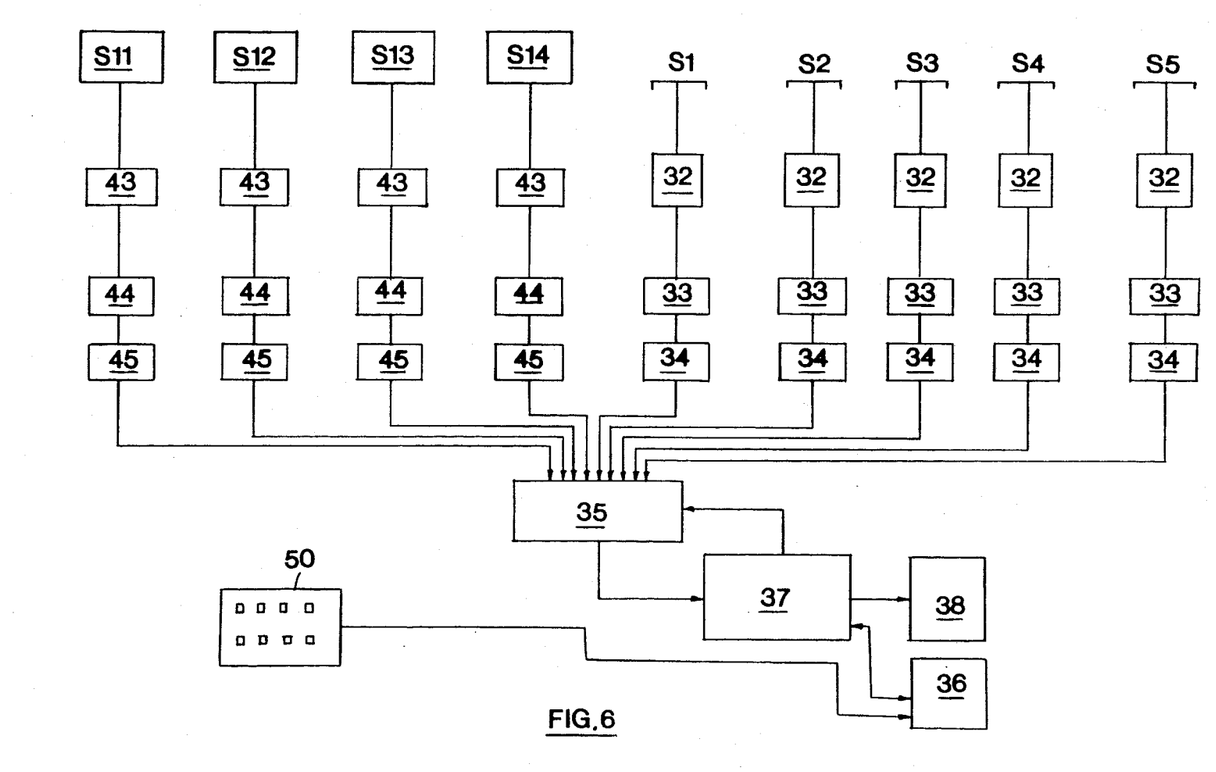
FIG. 6 is blocked circuit diagram of the overall apparatus.

Referring now to FIG. 6 of the drawings, the apparatus for measuring grain loss in accordance with the present invention will now be described. The sensor or detectors S1, S2 and S3 are, as already mentioned, of the impact type and produce an analogue signal representative of each impact detected. The sensors S1, S2 and S3 are illustrated in FIG. 6, together with the further sensors S4 and S5 and associated circuitry, which are representative of any additional sensors which may be employed at any desired location in the combine harvester and which equally are of the impact type.

Each sensor S1–S5 has associated with it a pulse former 32 which converts the analogue signals into calibrated pulsed signals; these pulsed signals being applied to counters 33 which have associated therewith buffers 34 into which the counts from the counters are dumped when the latter are reset, thus allowing the counters to continue counting. The output of each buffer 34 is applied to a multiplexer 35 which has a two-way connection with a microprocessor 37 to which also are connected a memory 36, a display unit 38 and a key pad 50. The memory 36 may be programmed with desired look-up tables and algorithms for calculating grain loss from the input data. The memory 36 also accepts input from the key pad 50 which is controlled by the machine operator to input selected factors, such as type and condition of the crop material, different ground speed factors, cutterbar width and wheel diameter.

The memory 36 further also accepts the counts from the counters 33 for storage in rotating registers in a manner to enable the microprocessor 37 to take into account the fact that it takes some time for crop material to be processed in the separating mechanism and to sequentially move past the locations of the various sensors S1-S5 from the inlet to the outlet of the separating mechanism. In other words, the microprocessor 37 does not compare the signals generated by all sensors S1-S5 at any given moment in time but instead compares related signals generated by the sensors S1-S5 at staggered time intervals. The system thus comprises time delays which are operable to synchronize the outputs of the sensors S1-S5 positioned at different locations in the process. The system further also includes filter means for cancelling out or greatly reducing the influences of any short time, abrupt fluctuations in the magnitude of the signals.

In addition to the sensors S1-S5 for detecting separated grain, the grain loss measurement apparatus also comprises a plurality of further sensors S11-S14, which are so disposed as to produce signals respresentative of, respectively, the moisture content of the crop being harvested; the grain flow in the combine harvester (i.e. the flow rate of the total amount of grain being harvested); the flow rate of all material other than grain (i.e. mainly straw) in the combine harvester and the ground speed. The moisture content sensor S11 may be in the form of a suitable humidity sensor that may be mounted within the straw elevator housing 8. The sensing of the grain flow may be effected by way of the flow metering device disclosed in European Patent Application No. 0.208.025 and which may be associated with the clean grain elevator 27. A similar flow metering device may be provided within the straw hood 16 for sensing the MOG flow. Alternatively an indication of the MOG flow may be obtained by means of a torque sensor that may be provided within the drive line to the header auger 7. The ground speed sensor S14 may be associated with one of the steerable rear wheels 3 and may be in the form of an rpm counter.

The output of each additional sensor S11-S14 is applied to an associated pulse former 43, a corresponding counter 44 and a corresponding buffer 45 before being applied to the multiplexer 35 in the same way as is done with the output signals from the sensors S1-S5.

Figure 7:
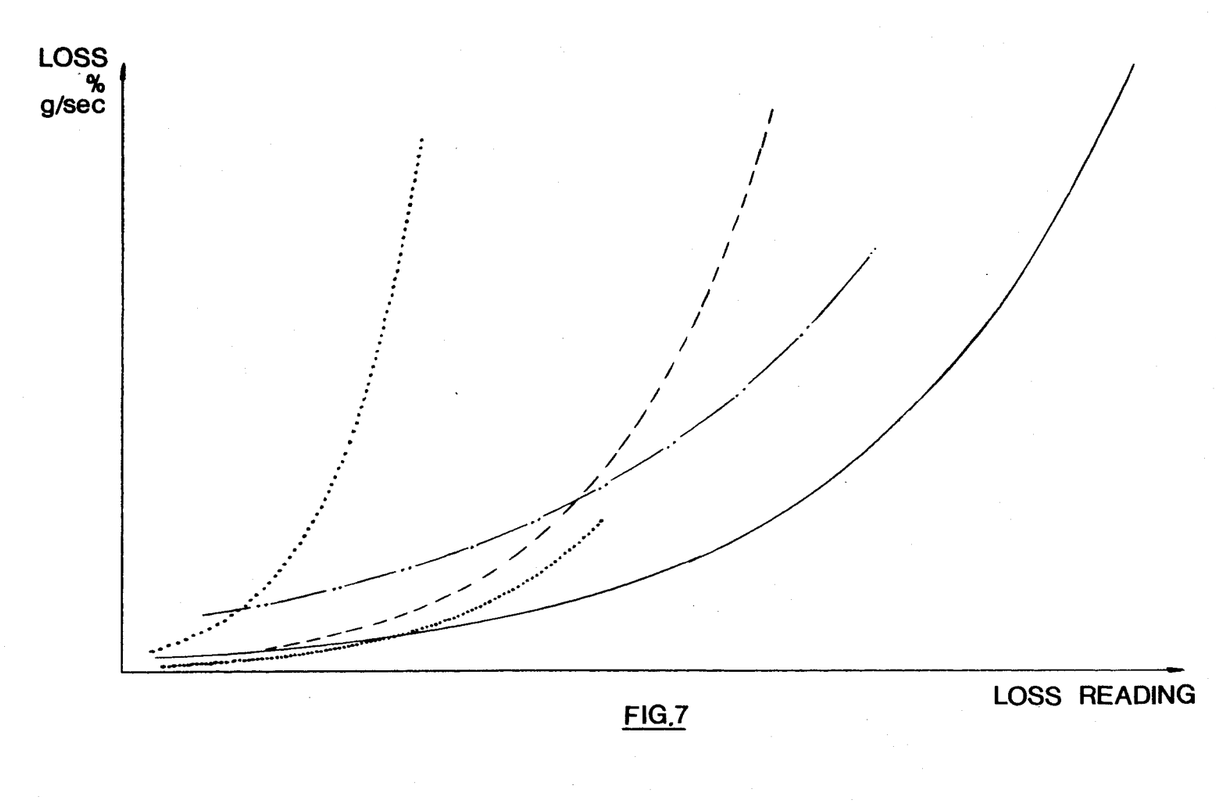
FIGS. 7 and 8 are graphs illustrating the correlation between the grain loss readings of a known grain loss monitor, respectively the grain loss monitor according to the present invention and the actual grain losses.

In the graph of FIG. 7 the relationship between actual losses (y-axis) and the indication of these losses obtained with a conventional grain loss monitor (x-axis) is illustrated. The various curves are indicative for different crops and crop conditions. It thus will be noticed therefrom that the relationship between the monitor reading and the actual grain losses appears to be far from linear. Moreover, it also will be noticed that this relationship varies widely dependent on a.o. the type of crop and the crop condition. As a consequence it is impossible for a combine operator to derive from a given grain loss reading the actual grain loss level because, amongst other things, he does not know which one of the many curves is applicable in the condition he is operating under. Furthermore, any given variation in the grain loss reading corresponds to a larger or smaller variation in the actual losses dependent on the location along any given curve. This even further complicates intelligent utilization of known grain loss monitors.

Figure 8:
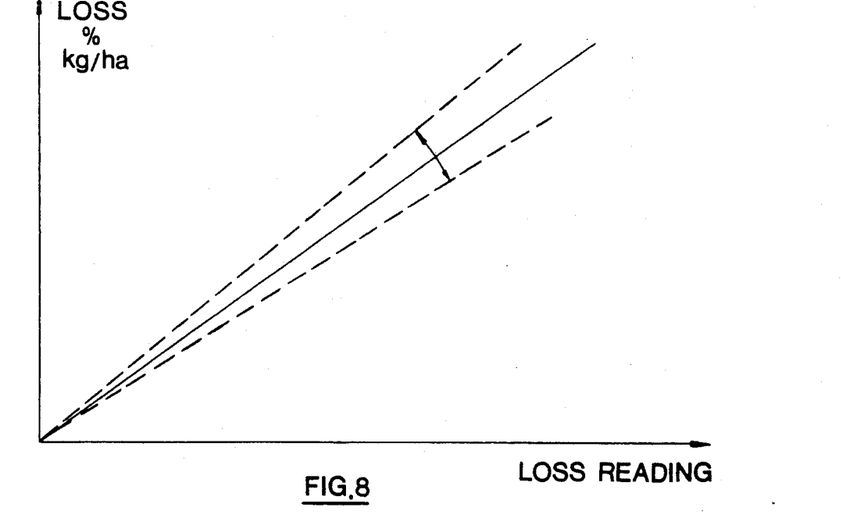

Consequently, it is highly desirable to obtain a grain loss reading of some type which has a linear relation with the actual grain loss on the one hand and of which the spreading of the linear relation, dependent on the crop and crop condition, is kept to a minimum on the other hand. Although, it would be ideal if this spreading could be eliminated altogether. These requirments are illustrated in FIG. 8 and may be obtained by the present invention as will be described hereafter in greater detail.

It has been found that, when using a particular algorithm of the readings obtained from the sensors S1, S2 and S3, a linear relation indeed exists between this algorithm and the actual grain losses in weight per unit of time (e.g. gram/second). One such algorithm is:

$$\frac{S1 \times S2}{S3}$$

However, other algorithms also may be used in other circumstances, such as:

$$\frac{S1 + S2}{S3} ; \frac{S2 \times S3}{S1} ; \frac{(S1 + S2)^2}{S3} ; \frac{S2^2}{S1} ; \frac{S2}{S1^2}$$

These algorithms of the grain sensor readings are characteristic values calculated from readings which are indicative of the grain separation in the separation process. These algorithms, which are in the form of ratios of impact detector signals, neutralize certain factors, such as the specific weight of the grain, that may have an influence on the sensor output signals.

However, an indication of the grain losses in weight per unit of time still is not very useful either. The more useful and meaningful indications of the actual grain losses should be expressed in terms of either a percentage (i.e. of the total amount of grain harvested) or weight per unit of surface (e.g. kg/ha). Starting from the indication in weight per unit of time, an indication of the actual grain loss in terms of percentage is obtained by dividing the aforementioned algorithm of the grain separation sensor readings by the grain flow readings obtained from the grain flow sensor S12. If the results of the algorithm of the grain separation sensor readings is indicated by A, then the new algorithm giving a percentage indication is expressed by:

$$B = \frac{A}{S12} (\%)$$

The indication of the actual grain losses in terms of weight per unit of surface is obtained by dividing the algorithm of the grain separation sensor reading by speed readings, which may be derived from the rpm readings from sensor S14 in combination with the header width and the wheel diameter. The latter two values normally need to be fed into the microprocessor by the combine operator. In simplified form, the new algorithm giving the indication of the actual losses in weight per unit of surface is expressed by:

$$C = \frac{A}{S14} (kg/ha)$$

In an attempt to reduce (or indeed ideally eliminate) the spreading of the relation between the actual grain losses and the algorithms B and C resulting from variations in the crops and crop conditions, correction factors are applied against said algorithms B and C. A first correction factor F1 takes into account crop parameters such as the type of crop (e.g. wheat, corn, barley, etc.) and specific weight of the crop. This first correction factor F1 may be derived from the look-up tables in the memory 36 in response to the input provided by the operator. The variations in crop parameters also may dictate a different algorithm A against which the grain sensor readings S1–S5 should be applied. This again is derived from look-up tables in the memory 36.

A second correction factor F2 takes into account crop condition parameters such as moisture content and MOG (material other than grain). These crop condition parameters are sensed with the sensors S11 and S13, the readings of which are applied against look-up tables in the memory 36 for determining the appropriate correction factor F2. This second correction factor F2 eventually also may take into account the degree of ripeness of the crop, this parameter normally being inputted to the processor means 37 by the operator. Again the variations in crop condition parameters also may dictate a different algorithm A against which the grain sensor readings S1–S5 should be applied. Similarly as indicated before, this may be derived from look-up tables in the memory 36 against which the readings of the sensors S11 and S13 are applied.

In summary, the corrected algorithms B' and C' thus can be expressed by:

$$B' = F1 \times F2 \times B$$

$$C' = F1 \times F2 \times C$$

In applying the foregoing principles in practice with the apparatus and the arrangement according to the present invention, the operator first has to input factors such as the wheel diameter (provided this has not yet been done by the manufacturer or the dealer), the header width and the type of crop to be harvested. During the subsequent operation of the grain loss measuring apparatus, the multiplexer 35 looks at the counts of the counters 34 and 45 in rotation. Each counter is accessed periodically and the data obtained is passed to the microprocessor 37. Based on such factors as the type of crop material being harvested, the moisture content and the amount of MOG measured by the sensors S11 and S13, the microprocessor 37 determines practically continuously, through access to the look-up tables of the memory 36, which algorithm A ought to be used for processing the grain sensor readings S1–S5. The microprocessor 37 further also continuously calculates the algorithm A using therefore the sensor readings S1–S5.

These calculated characteristic values of grain separation in the combine harvester process are corrected with the correction factors F1 and F2 which again may be derived from look-up tables in the memory 36 as already explained and against which crop parameters and crop condition parameters sensed by the sensors S11 and S13 may be applied.

To arrive at the indication of the actual grain losses in terms of either percentages of the total yield or weight per unit of surface, the corrected algorithms, as obtained in the way as indicated above, are divided in the microprocessor 37 either by the grain flow readings obtained from the sensor S12 or by measures representative of the harvesting speed or capacity in, for example, hectares per hour and which themselves are derived from the rpm readings from the rpm sensor S14 in combination with the header width and wheel diameter values previously stored in the memory 36 by the operator.

The foregoing process thus provides on-the-go indications, in absolute figures, of the grain loss rates of the threshing and separating process (and/or of the cleaning process) in a combine harvester in terms of percentages of total yield and/or weight per unit of surface; these indications being displayed on the display unit 38.

The present invention represents an extremely significant advance in the art of crop harvesting from the standpoint of being able to measure in substantially absolute terms the amount of crop (grain) being lost and thus being able to alter the operating conditions of the machine to maintain that loss at an acceptable level while optimizing the harvesting speed. To date, no apparatus for providing such a measurement of grain loss has been produced.

While the preferred structure, in which the principles of the present invention have been incorporated, is described above and is shown in the accompanying drawings, it is to be understood that the invention is not to be limited to the particular details as described above and shown in said drawings, but that, in fact, widely different means may be employed in the practice of the broader aspects of the invention.

As an example, it is conceivable that acceptable results already can be obtained with an apparatus generally as described above but wherein the moisture content sensor S11 and the MOG sensor S13 are left out. In this case, the operator eventually may have to key in some more parameters prior to starting operation. The microprocessor thus may be programmed to enable the input of specific average moisture content values on the one hand and average MOG values on the other hand.

In case in addition to the foregoing also the grain flow sensor S12 and the speed sensor S14 would be left out, then the apparatus still could measure the absolute grain losses in terms of weight per unit of time (e.g. gram/sec). As already indicated, such an indication is less meaningful than the indications obtained with the preferred embodiment of the present invention. Nevertheless, the foregoing already forms a remarkable advance with respect to the state of the art.

It thus is conceivable that in its simplest form, the grain loss monitor according to the invention comprises a microprocessor to which at least a pair of grain impact sensors are coupled which are operatively associated with the threshing and separating mechanism and/or the cleaning apparatus at different locations along the path of the crop material through the machine and which are operable to produce signals representative of the grain separation rates in said mechanism; said microprocessor having stored therein predetermined data and being programmed to enable the input of certain operating condition parameters and to compare with said predetermined data and said operating condition parameters the signals received from the grain impact sensors to derive therefrom a grain loss indication in substantially absolute figures. The type and condition of the crop material eventually together with other aspects may determine said operating condition parameters. If the foregoing apparatus further also comprises a speed sensor S14 and/or a grain flow sensor S12 then the grain loss indications can be expressed in terms of weight per unit of surface or percentage of total yield respectively.

It further also will be appreciated that the display means 38 may appear in different forms such as e.g. a needle which is movable relative to a scale or an LCD.

Having thus described the invention, what is claimed is:

1. In an apparatus including detector means associated with a grain handling mechanism in a crop harvesting machine for measuring grain loss from said machine, said grain handling mechanism including threshing means for threshing grain from crop material, separating means for removing threshed grain from said crop material, and cleaning means in flow communication with said separating means to receive separated grain therefrom and clean trash material from said separated grain to create cleaned grain, said grain moving through said grain handling mechanism along a crop flow path terminating at the discharge of said grain from said grain handling mechanism, said crop material defining operating condition parameters affecting the efficiency of said grain handling mechanism to harvest said crop material, the improvement comprising:

at least two detector means associated with said grain handling mechanism, each of said detector means being provided at spaced apart locations along the length of the flow path of the crop material through said grain handling mechanism and being operable to measure grain separation in said grain handling mechanism at each said location within the machine and to produce electrical output signals representative thereof;

processor means programmed with a plurality of grain loss algorithms against which the output signals are applied to derive therefrom a substantially absolute indication of grain loss at a given instant, said processor means being operable to select one of said algorithms for utilization in response to said operating condition parameters, each said algorithm calculating the absolute indication of grain loss using a ratio of selected said output signals; and a grain flow detector operable to produce signals indicative of the rate of grain flow through said grain handling mechanism, said processor means being programmed to divide the signals derived from said algorithm by the signals derived from the grain flow detector so that the substantially absolute grain loss indication is expressed in terms of percentage.

2. The apparatus of claim 1 wherein input means is provided for manually inputting said operating condition parameters into said processor means.

3. The apparatus of claim 2 further comprising further detector means operatively coupled to said processor means to detect said operating condition parameters from said crop material.

4. The apparatus of claim 3 wherein said processor means is programmed to apply said operating condition parameters against look-up tables stored in said processor means to derive therefrom a correction factor to multiply times the utilized algorithm to derive said substantially absolute grain loss indication therefrom.

* * * * *